(12) United States Patent
Inata et al.

(10) Patent No.: US 9,918,004 B2
(45) Date of Patent: Mar. 13, 2018

(54) CAMERA BODY CAPABLE OF DRIVING AN IMAGE SENSOR ALONG AN OPTICAL AXIS IN RESPONSE TO A CHANGE IN AN OPTICAL STATE OF AN OBJECT IMAGE

(71) Applicant: Panasonic Intellectual Property Management Co., Ltd., Osaka (JP)

(72) Inventors: Masahiro Inata, Hyogo (JP); Norikazu Katsuyama, Osaka (JP); Satoshi Matsui, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/991,221

(22) Filed: Jan. 8, 2016

(65) Prior Publication Data
US 2016/0234422 A1 Aug. 11, 2016

(30) Foreign Application Priority Data

Feb. 6, 2015 (JP) .................................. 2015-021938
Nov. 4, 2015 (JP) .................................. 2015-216309

(51) Int. Cl.
*H04N 5/232* (2006.01)
*H04N 5/225* (2006.01)
*H04N 5/235* (2006.01)

(52) U.S. Cl.
CPC ....... *H04N 5/23212* (2013.01); *H04N 5/2253* (2013.01); *H04N 5/2254* (2013.01); *H04N 5/2351* (2013.01); *H04N 5/23296* (2013.01)

(58) Field of Classification Search
CPC .............................. H04N 5/23212; G03B 3/04
See application file for complete search history.

(56) References Cited

U.S. PATENT DOCUMENTS

| 4,247,190 | A | * | 1/1981 | Hashimoto | ............ G03B 17/14 |
| | | | | | 359/828 |
| 5,319,462 | A | * | 6/1994 | Haruki | ............... H04N 5/23212 |
| | | | | | 348/347 |
| 5,969,760 | A | * | 10/1999 | Ernest | ...................... G02B 7/28 |
| | | | | | 348/219.1 |
| 2007/0116451 | A1 | * | 5/2007 | Yamamoto | ................ G02B 7/08 |
| | | | | | 396/133 |
| 2009/0009651 | A1 | * | 1/2009 | Takayanagi | ............ G03B 13/36 |
| | | | | | 348/345 |

(Continued)

FOREIGN PATENT DOCUMENTS

| JP | 2009-124603 | 6/2009 |
| JP | 2010-107866 | 5/2010 |

(Continued)

*Primary Examiner* — Gary C Vieaux
(74) *Attorney, Agent, or Firm* — Wenderoth, Lind & Ponack, L.L.P.

(57) ABSTRACT

A camera body, to which a lens barrel having an optical system can be attached, includes a controller that controls the camera body, an image sensor that captures an object image, and an image sensor actuator that drives the image sensor along an optical axis. The controller determines a change in an optical state of the object image captured by the image sensor and, in response to the determination, drives the image sensor actuator to move the image sensor to a predetermined reference position located within a movable range of the image sensor.

13 Claims, 15 Drawing Sheets

(56) References Cited

U.S. PATENT DOCUMENTS

| | | | | |
|---|---|---|---|---|
| 2009/0322931 A1* | 12/2009 | Cheng | ..................... | G02B 7/08 |
| | | | | 348/345 |
| 2010/0225780 A1* | 9/2010 | Shimizu | ............. | H04N 5/23219 |
| | | | | 348/223.1 |
| 2013/0162879 A1* | 6/2013 | Yoshida | ............. | H04N 5/23212 |
| | | | | 348/333.08 |
| 2015/0062409 A1* | 3/2015 | Tsuzuki | ................ | G02B 7/102 |
| | | | | 348/342 |

FOREIGN PATENT DOCUMENTS

| | | |
|---|---|---|
| JP | 2010-128205 | 6/2010 |
| JP | 2013-186313 | 9/2013 |

\* cited by examiner

CAMERA BODY CAPABLE OF DRIVING AN IMAGE SENSOR ALONG AN OPTICAL AXIS IN RESPONSE TO A CHANGE IN AN OPTICAL STATE OF AN OBJECT IMAGE

BACKGROUND

1. Technical Field

The present disclosure relates to a camera body of a digital camera or the like capable of driving an image sensor and performing AF (auto-focus) control.

2. Description of the Related Art

A digital camera is conventionally known that includes a camera body having an image sensor and a lens barrel attachable to the camera body (for example, see PTL 1). Such a digital camera includes a focus lens for focus adjustment, lens drive means for moving the focus lens along an optical axis, image sensor drive means for moving an image sensor for capturing an object image along an optical axis, focus evaluating means for outputting the degree of focusing of the object image captured by the image sensor as a focus evaluation value, and focus control means for moving the focus lens and the image sensor based on the focus evaluation value. The image sensor drive means determines an initial position of the image sensor based on an output of the focus evaluating means. This prevents the image sensor from exceeding the control range when the image sensor is controlled to be micro-driven in autofocusing.

CITATION LIST

Patent Literature

PTL 1: Unexamined Japanese Patent Publication No. 2010-107866

SUMMARY

The present disclosure provides a camera body and an imaging device that are useful for accurate autofocusing even if information is not obtained from a lens barrel.

A camera body of the present disclosure, to which a lens barrel having an optical system can be attached, includes a controller that controls the camera body, an image sensor that captures an object image, and an image sensor actuator that drives the image sensor along an optical axis. The controller determines a change in an optical state of the object image captured by the image sensor and, in response to the determination, drives the image sensor actuator to move the image sensor to a predetermined reference position located within a movable range of the image sensor.

An imaging device of the present disclosure comprises a lens barrel and the camera body. The lens barrel includes a plurality of lenses and a manual input device for performing a first focus adjustment by moving the plurality of lenses. The camera body has a mount to which the lens barrel is detachably mounted.

The camera body and the imaging device of the present disclosure are useful for accurate autofocusing even if information is not obtained from the lens barrel.

DETAILED DESCRIPTION

Figure 1:
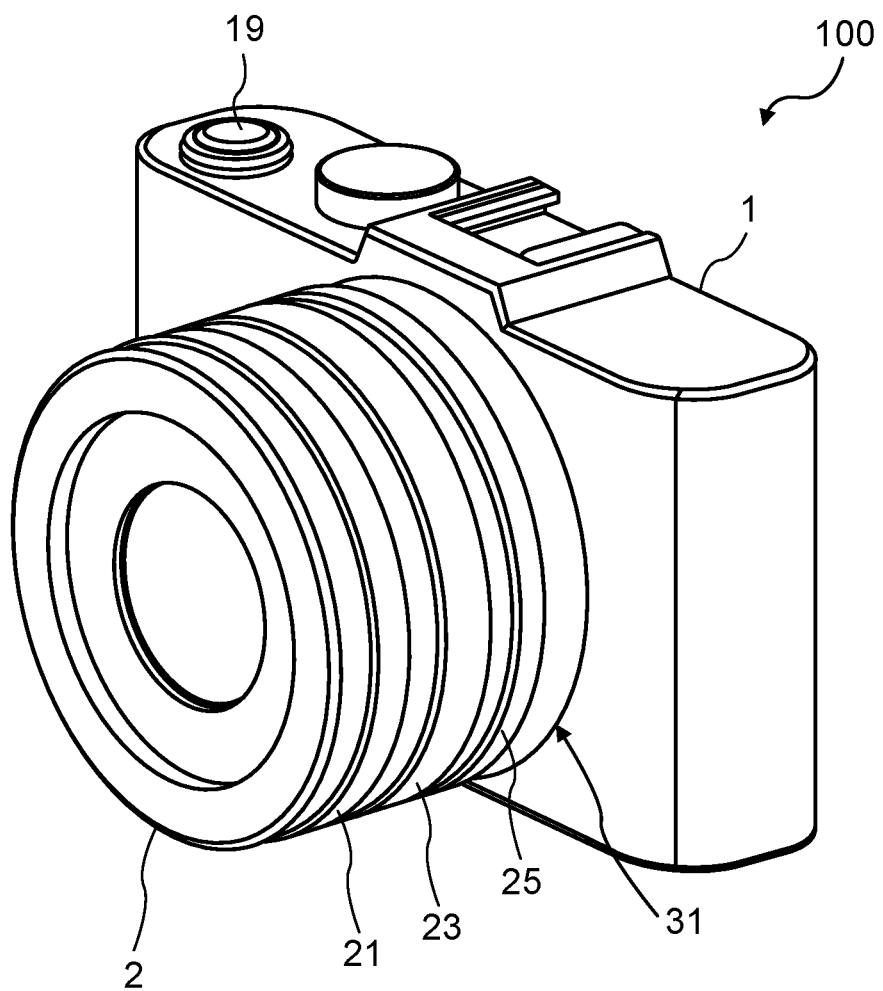
FIG. 1 is an external view of a digital camera according to an exemplary embodiment.

Exemplary embodiments will now be described in detail with reference to the drawings. Unnecessary details, however, may be omitted. For example, detailed description of well-known matters and repeated description of substantially the same structure may be omitted. This is to avoid unnecessary redundancy in the following description and to facilitate understanding by those skilled in the art.

The inventor(s) provides the accompanying drawings and the description below to enable those skilled in the art to have a thorough understanding of the present disclosure, and these are not intended to limit the subject matter defined by the claims.

Background Of Camera Body And Imaging Device According To The Present Exemplary Embodiment Conventionally, there is a great need for manually-operated focus adjustment in an interchangeable lens type digital camera, in particular in a professional-use digital camera, and the manually-operated focus adjustment is mainly used. However, focus adjustment performed only manually is becoming difficult due to processing of 4K images with a high resolution and a shallow depth of field associated with an increased size of an image sensor. As such, autofocus adjustment on the part of a camera body can be made in addition to the manually-operated focus adjustment on the part of a lens barrel.

However, when an optional interchangeable lens barrel is attached to the camera body of the interchangeable lens type digital camera, the camera body may be unable to communicate electrically with the lens barrel. In this case, since the camera body cannot obtain information from the lens barrel, the focus adjustment is not accurate enough in autofocusing.

In order to assist such a focus adjustment, a technique is provided whereby an in-focus position, i.e., a focus position, can be checked by displaying a partially enlarged image to a user, for example, using a viewfinder. Alternatively, a technique is provided whereby a focus position can be checked, for example, by highlighting contour components of an image using a viewfinder. However, the former technique, which cannot check the entire image, suffers from poor operability and may lose sight of the focus position upon movement of an object. For the latter technique in which edges are enhanced over the entire image, it is difficult to determine whether the image is in focus, and edge components may not be visible in a low-contrast object.

The camera body of the digital camera according to the present exemplary embodiment takes advantage of adjustment by manual operation performed on the part of the lens barrel and also allows for automatic adjustment on the part of the camera body even if the camera body cannot communicate electrically with the lens barrel attached.

A camera body and an imaging device including the camera body according to the present exemplary embodiment are described below in detail with reference to the drawings.

Exemplary Embodiment

An exemplary embodiment will now be described with reference to FIGS. 1 to 13.

1-1. Structure 1-1-1. Structure of Digital Camera

An example of an interchangeable lens type digital camera is illustrated as an exemplary embodiment of an imaging device according to the present disclosure. FIG. 1 is an external view of digital camera 100 (an example of an imaging device) according to an exemplary embodiment. Digital camera 100 includes interchangeable lens barrel 2 (an example of a lens barrel) and camera body 1 (an example of a camera body). Lens barrel 2 having various photographing optical systems (imaging optical systems) can be attached to camera body 1 through mount 31.

1-1-2. Structure of Lens Barrel

Figure 2:
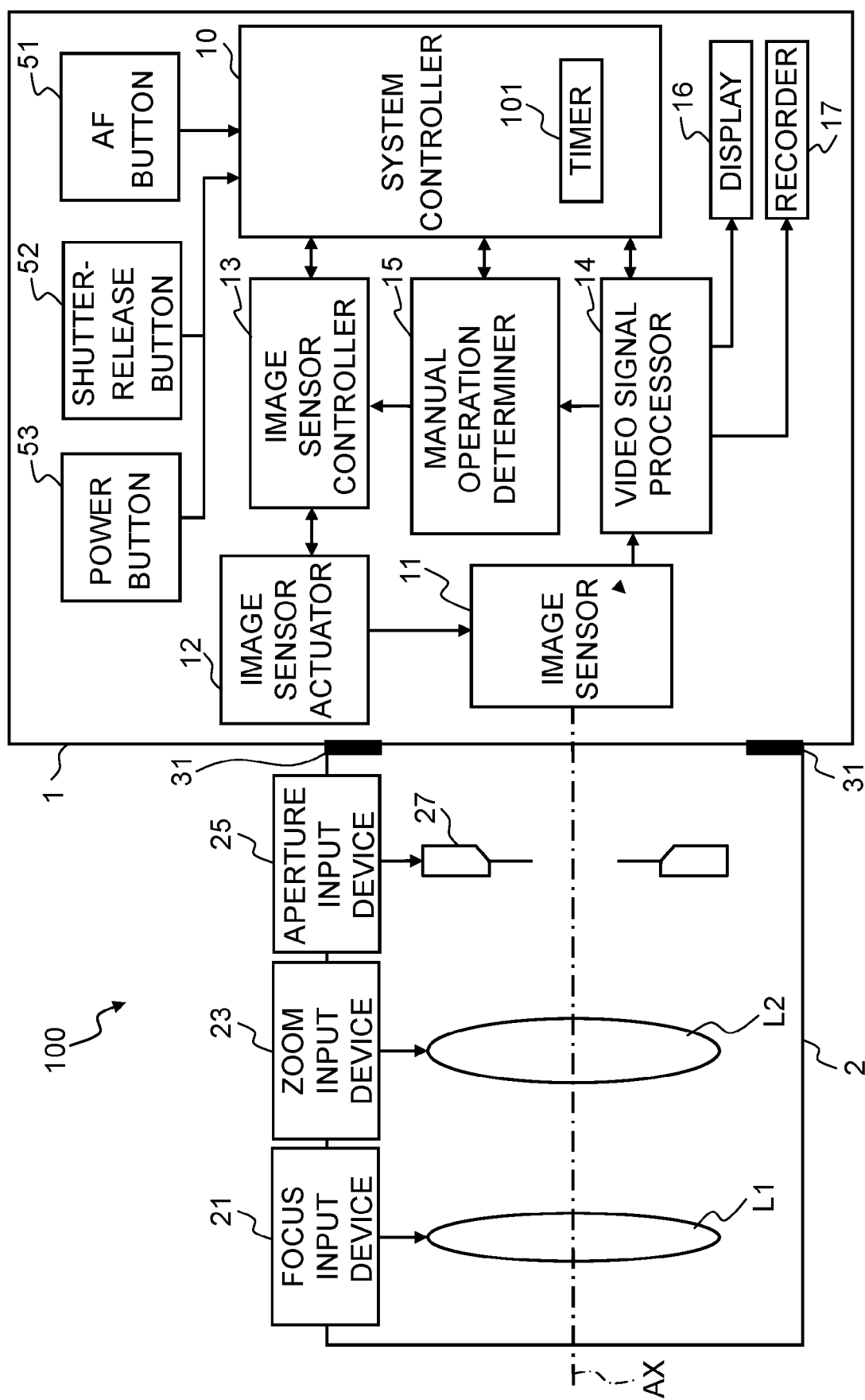
FIG. 2 is a block diagram illustrating an internal structure of the digital camera.

As illustrated schematically in FIG. 2, lens barrel 2 includes focus input device 21 (an example of a manual input device), zoom input device 23 (an example of a manual input device), aperture input device 25 (an example of a manual input device), optical systems such as lenses L1, L2, aperture 27 and the like.

Focus input device 21 is configured with, for example, a focus ring as illustrated in FIG. 1. Focus adjustment is performed when a user operates focus input device 21 (e.g., he/she turns the focus ring).

Zoom input device 23 is configured with, for example, a zoom ring as illustrated in FIG. 1. Zoom adjustment, such as for wide angle and for telephoto angle, is made when the user operates zoom input device 23 (e.g., he/she turns the zoom ring).

Lens L1 is an optical system including a focusing lens. Lens L1 is moved along optical axis AX by a given drive mechanism in response to the user operating focus input device 21. Lens L2 is an optical system including a zoom lens. Lens L2 is moved along optical axis AX by a given drive mechanism in response to the user operating zoom input device 23.

Aperture input device 25 is configured with, for example, an aperture ring as illustrated in FIG. 1. A given drive mechanism adjusts the amount of light passing through an opening of diaphragm 27 when the user operates aperture input device 25 (e.g., he/she turns the aperture ring).

Diaphragm 27 increases or decreases an opening area by the given mechanism in response to the user operating aperture input device 25 to adjust the amount of light passing through lenses L1, L2.

1-1-3. Structure of Camera Body

As illustrated schematically in FIG. 2, camera body 1 includes system controller 10 (an example of a controller), image sensor 11, image sensor actuator 12, image sensor controller 13 (an example of a controller), video signal processor 14, manual operation determiner 15 (an example of a controller), display 16, recorder 17, mount 31 (an example of a mount), AF (auto-focus) button 51 (an example of an input device), shutter-release button 52, and power button 53.

System controller 10 includes a processor, such as a CPU, a memory and the like and controls the entire camera body 1. In particular, as described below, system controller 10 is a circuit that detects a contrast value (an example of a contrast value) and a brightness value (an example of brightness information) from magnitudes of components of a video signal received from image sensor 11 through video signal processor 14 and performs AF (auto-focus) control. System controller 10 includes timer 101. Timer 101 measures determination timing of manual operation of lens barrel 2 as discussed below.

Image sensor 11 is configured with, for example, a CCD (Charge Coupled Device) sensor device or a CMOS (Complementary Metal-Oxide Semiconductor) sensor device. Image sensor 11 converts an optical image captured through lens barrel 2 into an electrical signal. Image sensor 11 of the present exemplary embodiment has a size including a number of pixels, for example, corresponding to a 4K image.

Image sensor actuator 12 drives image sensor 11 in response to a signal from image sensor controller 13. The driving of image sensor 11 involves movement along optical axis AX in performing AF control as discussed below. Image sensor controller 13, including a processor, such as a CPU, a memory and the like, is a circuit that drives image sensor actuator 12 in response to commands of system controller 10 and manual operation determiner 15.

Manual operation determiner 15, including a processor, such as a CPU, a memory and the like, is a circuit that determines whether manual operation is performed on the part of lens barrel 2 as discussed below.

Video signal processor 14, including a processor, such as a CPU, a memory and the like, is a circuit that processes the output signal from image sensor 11 and outputs it as image information to display 16 and recorder 17.

Display 16 is a display unit, such as an LCD or organic EL display, and displays the output signal, i.e., image data, from video signal processor 14.

Recorder 17 is a semiconductor memory such as, for example, an SD (Secure Digital) card or SSD (Solid-State Disk) and stores the output signal, i.e., image data, from video signal processor 14.

Mount 31 has a structure to which various interchangeable lens barrels 2 can be attached.

AF button 51, which is operated by the user, outputs a signal to command AF control described below. Specifically, AF button 51 transmits the signal to system controller 10. System controller 10 commands image sensor controller 13 to perform AF control based on a contrast value of an image signal from video signal processor 14.

Shutter-release button 52, which is operated by the user, commands video signal processor 14 through system controller 10 to record image information, whereby shooting is performed.

Power button 53, which is operated by the user, turns on and off camera body 1.

In camera body 1, some or all of system controller 10, image sensor controller 13, manual operation determiner 15 and video signal processor 14 may be configured with a single processor (an example of a controller) or an integrated circuit (an example of a controller).

Camera body 1 determines a predetermined optical change in an image signal through image sensor 11, i.e., an optical change in an object image, to be a user's manual operation of lens barrel 2 and performs AF control based on lens adjustment by the determined manual operation. Thus, AF control could be properly performed if lens barrel 2 not capable of electrically communicating with camera body 1 is attached.

Operation of camera body 1 will now be described in detail.

1-2. Operation

The operation of camera body 1 according to the present exemplary embodiment is described below with reference to FIGS. 3 to 13.

1-2-1. Overall Operation

Figure 3:
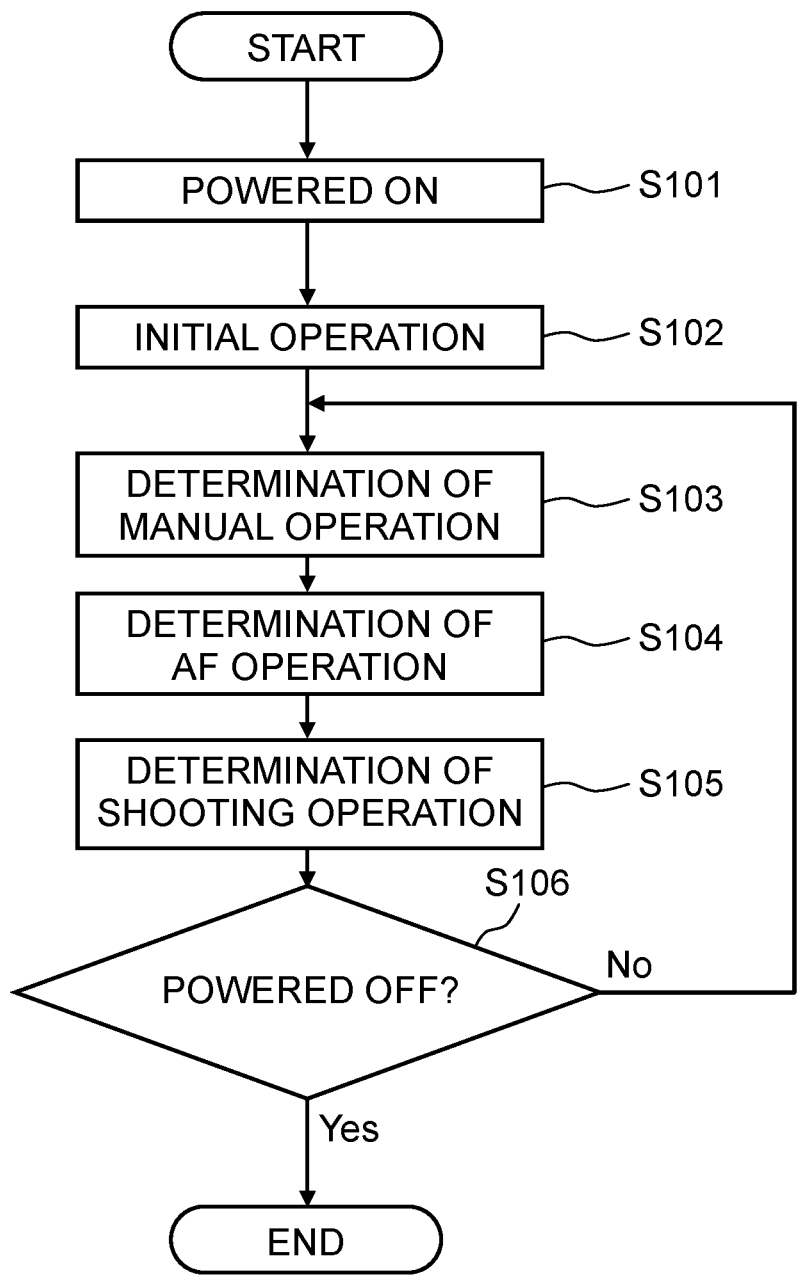
FIG. 3 is a flowchart illustrating an overall operation of a camera body of the digital camera.

FIG. 3 is a flowchart illustrating an overall operation of camera body 1, which is mainly performed by system controller 10 of camera body 1.

S101: System controller 10 detects that camera body 1 is turned on when a user operates power button 53.

S102: System controller 10 performs initial operation. The initial operation causes image sensor 11 to return to a predetermined reference position (as described below) along optical axis AX, and includes obtaining an evaluation value (a contrast value and a brightness value) of an image signal, and resetting timer 101.

S103: Manual operation determiner 15 determines whether manual operation is performed on the part of lens barrel 2 based on the image signal from video signal processor 14. Details of the determination are discussed below.

S104: System controller 10 determines AF (auto-focus) operation. When system controller 10 determines that AF operation is performed, system controller 10 further performs, using AF control, a focus adjustment subsequent to the focus adjustment performed in advance by manual operation on the part of lens barrel 2 (an example of a first focus adjustment), where a further adjustment is an example of a second focus adjustment. This will be described in more detail below.

S105: System controller 10 determines shooting operation. When system controller 10 determines that the shooting operation is performed, system controller 10 performs shooting. This will be described in more detail below.

S106: System controller 10 repeats steps S103 to S105 unless power-off is detected. When power-off is detected, the process is completed. Reference position of image sensor 11

Since image sensor 11 has a range in which image sensor 11 can be moved along optical axis AX (i.e., a movable range), a reference position, i.e., a position of image sensor 11 when AF control is started, is set such that AF control can be properly performed. A reason for the reference position of image sensor 11 to be set in such a manner is described with reference to FIGS. 8 and 9.

Figure 8:
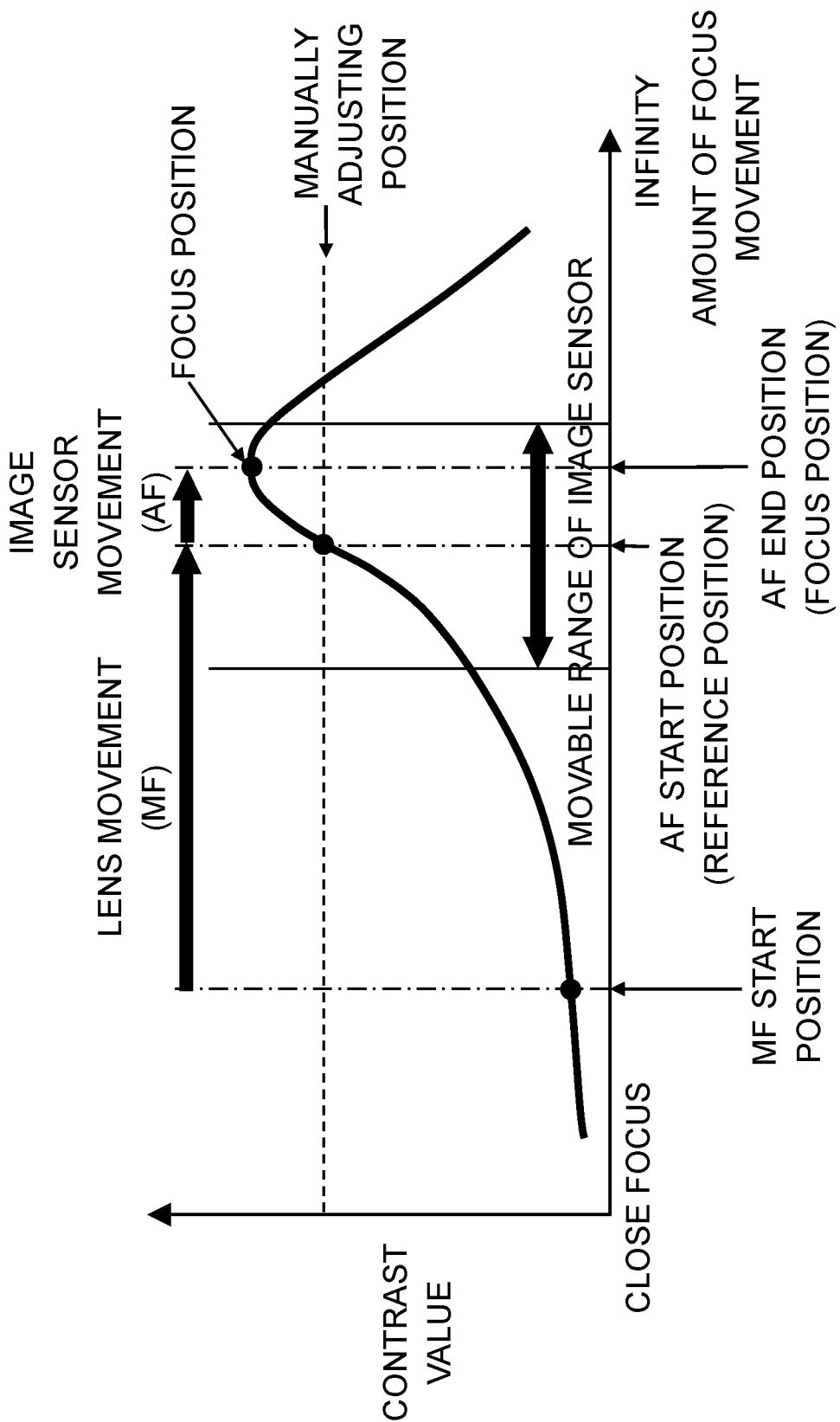
FIG. 8 is a diagram illustrating operation of an image sensor of the camera body.
Figure 9:
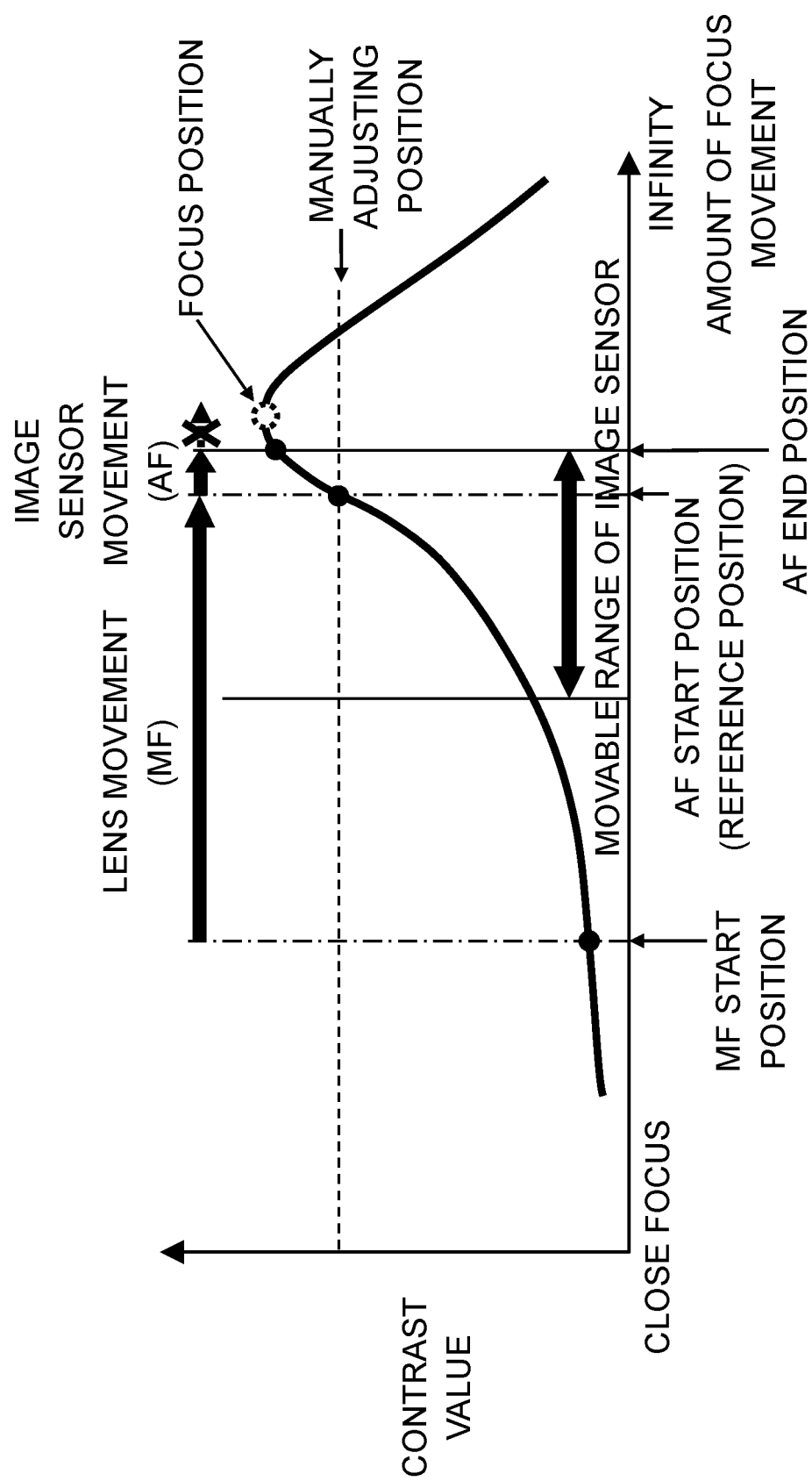
FIG. 9 is a diagram illustrating operation of the image sensor of the camera body.

FIGS. 8 and 9 are graphs, where the position of image sensor 11 from close focus (the left-hand side of the figures) to infinity (the right-hand side of the figures) along optical axis AX is shown on the horizontal axis and the contrast value of an image signal corresponding to the position is shown on the vertical axis. As illustrated in FIGS. 8 and 9, movement of image sensor 11 along optical axis AX is limited within a predetermined movable range. It is therefore preferable that image sensor 11 is always ready to start AF control from a predetermined reference position so that the movement of image sensor 11 within the movable range allows for reliable AF control. As such, in the present exemplary embodiment, the reference position of image sensor 11, i.e., AF (auto-focus) start position, is set to be located substantially in a center of the movable range as illustrated in FIG. 8. Specifically, the manual operation (MF) of the user on the part of lens barrel 2 moves lenses L1, L2 to adjust focus and image sensor 11 is then moved under AF control, whereby a final focus position is detected. Thus, image sensor 11 is located substantially in the center of the movable range so that the focus position (i.e., a position of image sensor 11 at which the contrast value is maximized) can be prevented from being outside the movable range of image sensor 11 when AF control is performed. FIG. 9 illustrates an example in which the reference position of image sensor 11 is on an infinity side of the movable range. In this example, the focus position will be outside the movable range of image sensor 11 when AF control is performed. Accordingly, in the example of FIG. 9, focusing may not be achieved since image sensor 11 cannot be moved to an optimum focus position.

Thus, the position of image sensor 11 is set such that the AF-controlled focus position is within the movable range of image sensor 11 in the following initial operation.

1-2-2. Initial Operation

Figure 4:
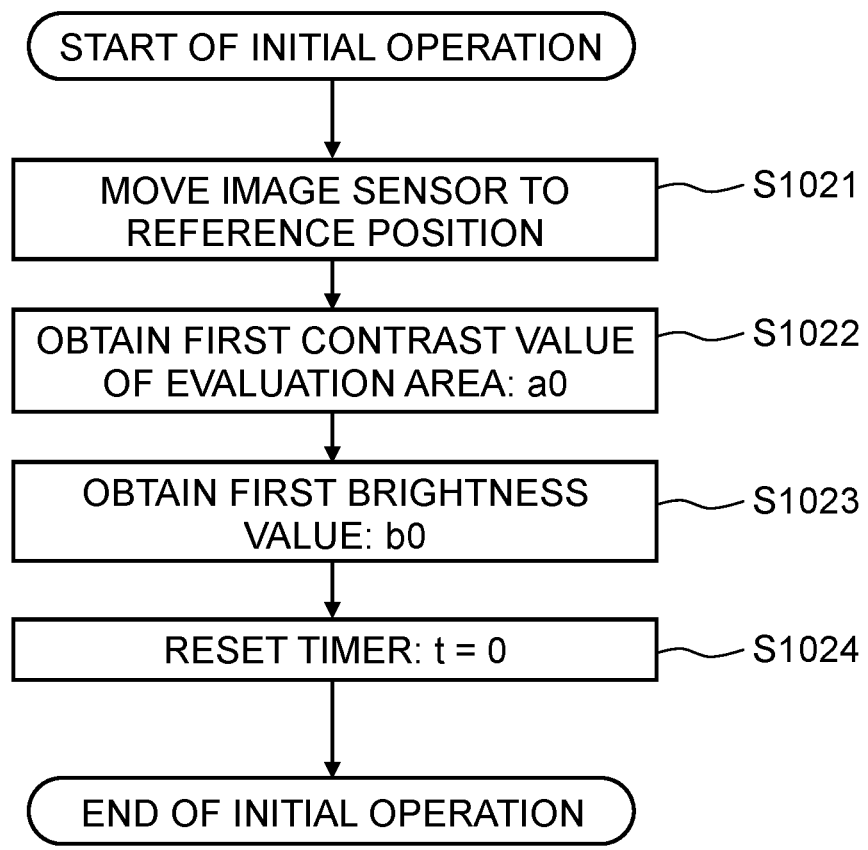
FIG. 4 is a flowchart illustrating initial operation of the camera body.

FIG. 4 is a flowchart showing a detailed process of the initial operation performed in step S102 of FIG. 3.

S1021: When power is turned on, system controller 10 outputs a command signal to image sensor actuator 12 through image sensor controller 13 and moves image sensor 11 to the reference position.

S1022: Of an image signal obtained from image sensor 11 through video signal processor 14, system controller 10 obtains first contrast value a0, which is a contrast value obtained based on an evaluation area, and stores first contrast value a0 in a memory.

Figure 10:
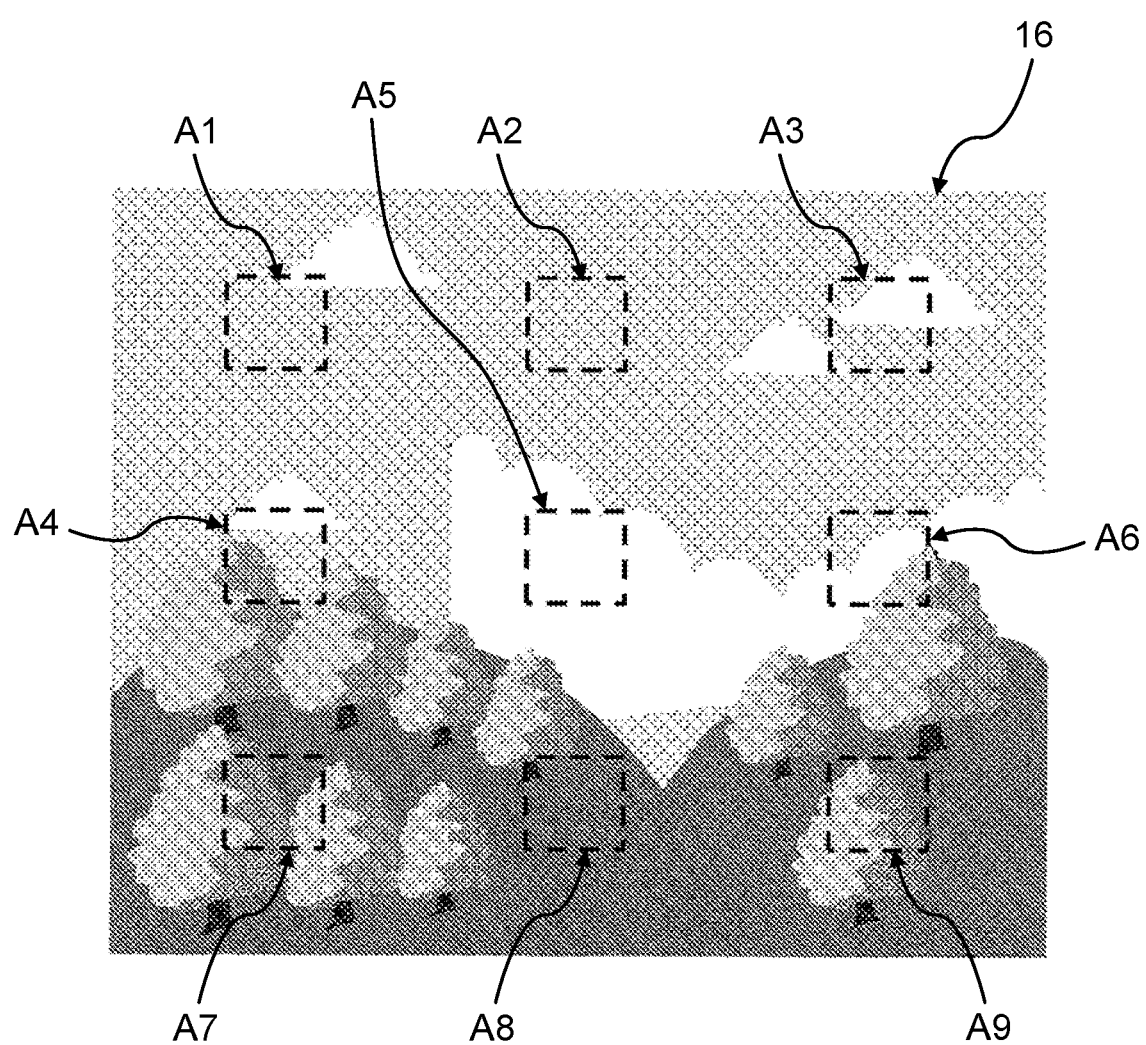
FIG. 10 is a diagram illustrating determination of manual operation by the camera body.

As illustrated in FIG. 10, the evaluation area is directed to image signals in predetermined areas of an image signal corresponding to a frame or a screen being a unit of display. In the illustration of FIG. 10, evaluation areas A1-A9 are set that are arranged to cover the entire screen of display 16. The evaluation area is not limited to the positions and number illustrated in the figure. System controller 10 obtains a representative value (e.g., a maximum value) of the contrast values of evaluation areas A1-A9 as first contrast value a0. This allows for obtaining a predetermined contrast value even if some of the evaluation areas contain a flat image that has low variation (i.e., low contrast). Note that system controller 10 can obtain a mean value or a median of the contrast values of evaluation areas A1-A9 and may set it as first contrast value a0.

S1023: System controller 10 obtains first brightness value b0, which is a brightness value of the image signal of each frame or screen obtained through video signal processor 14, and stores first brightness value b0 in the memory.

S1024: System controller 10 resets timer variable t of timer 101 to zero. The determination timing of manual operation is measured by timer 101, where the determination timing is defined as a time when a predetermined time Δt has elapsed since the preceding determination timing.

System controller 10 proceeds to step S103 in FIG. 3 when the initial operation is completed.

1-2-3. Determination of Manual Operation

Figure 5:
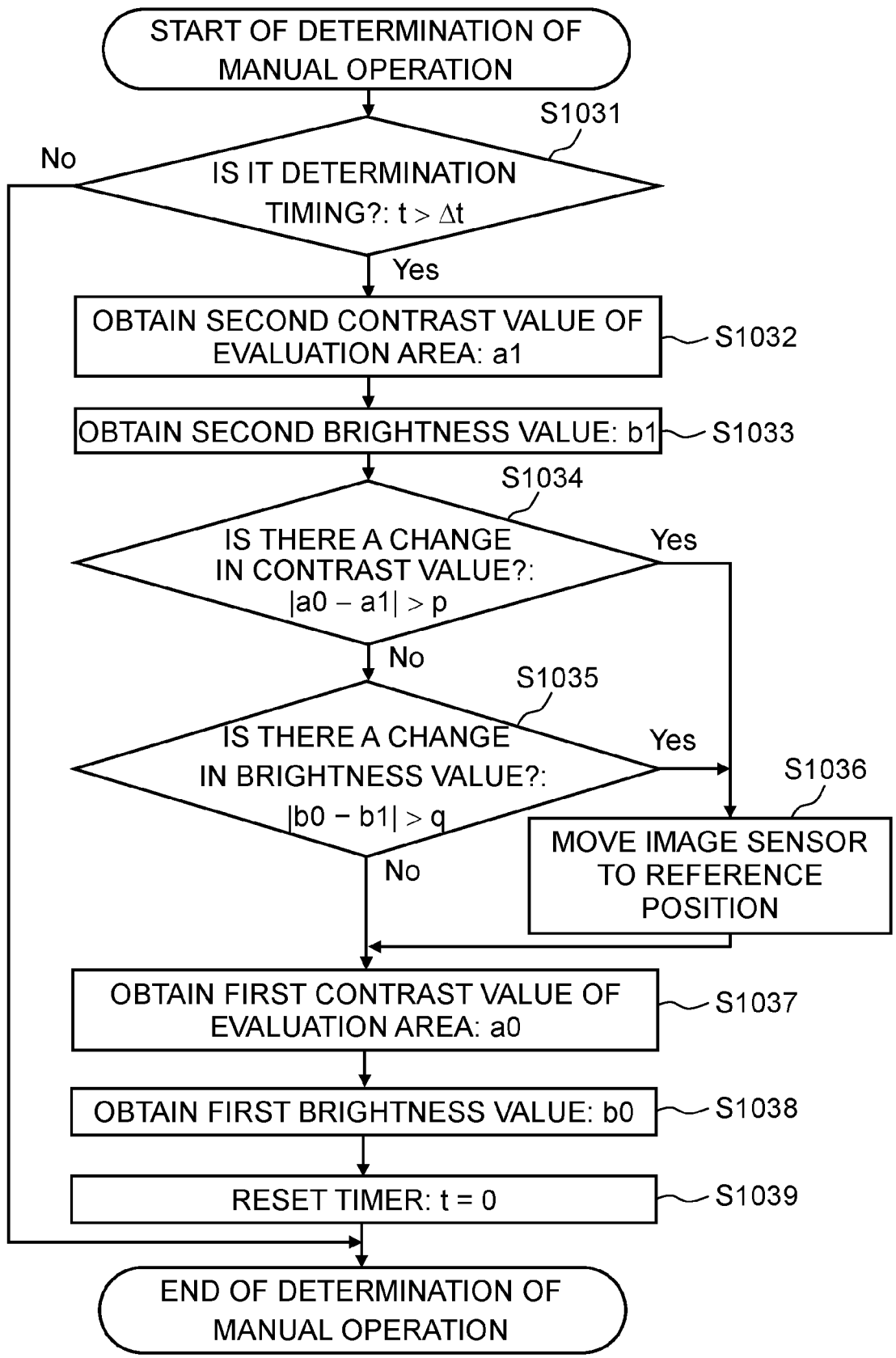
FIG. 5 is a flowchart that includes determination of manual operation by the camera body.

FIG. 5 is a flowchart showing a detailed process of the determination of manual operation performed in S103 of FIG. 3.

Here, the manual operation is an operation on the part of lens barrel 2, and the manual operation such as a focus operation, zoom operation or aperture operation is performed to change an optical state of the image captured by image sensor 11. Camera body 1 detects a change in a state of an image signal through image sensor 11 and determines whether the manual operation is performed.

S1031: Manual operation determiner 15 determines whether it is time for the determination timing of manual operation. The predetermined time Δt from the preceding determination timing to the current determination timing is set for the determination of the manual operation, and whether the manual operation is performed is determined based on a change between the evaluation values (contrast values and brightness values) before and after the elapse of time Δt.

Figure 11:
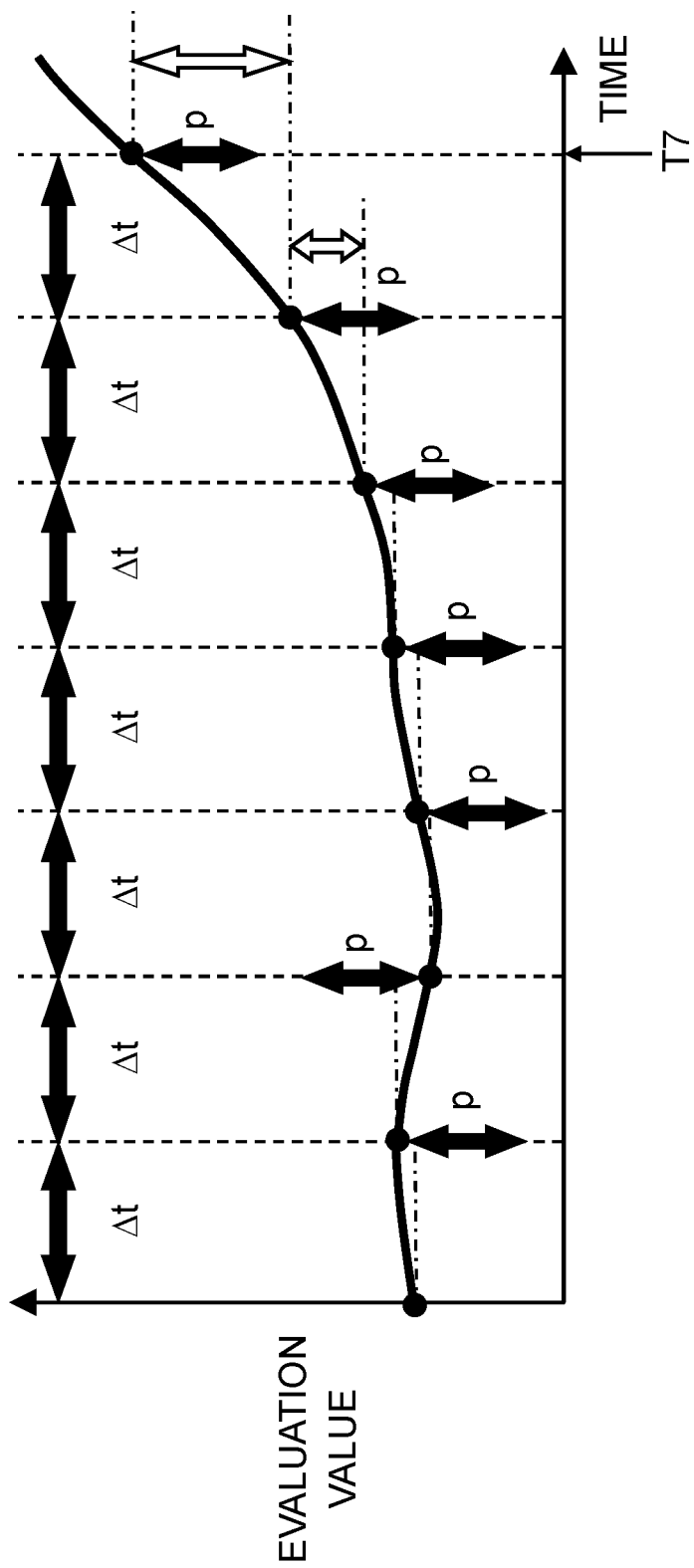
FIG. 11 is a diagram illustrating determination of manual operation by the camera body.
Figure 12:
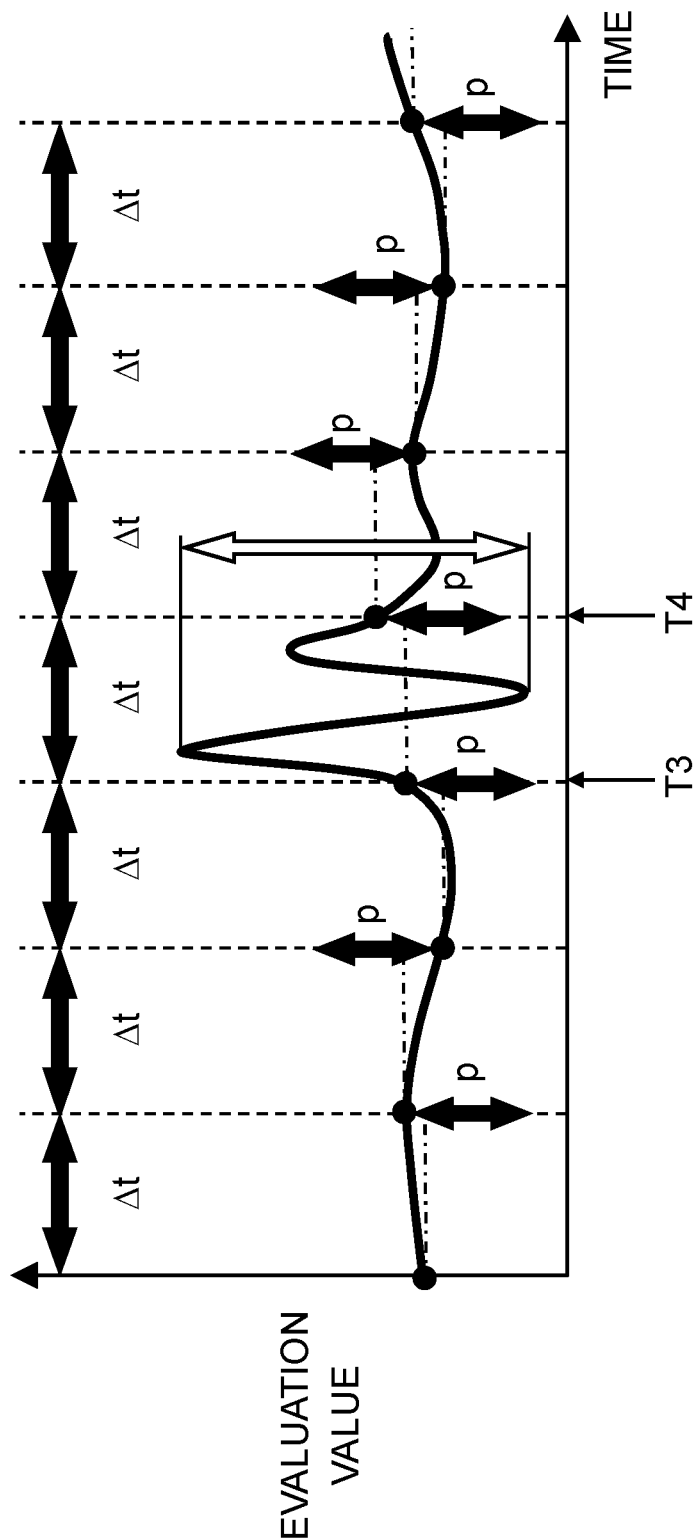
FIG. 12 is a diagram illustrating determination of manual operation by the camera body.

Time Δt is set to a time period during which a change in contrast due to, for example, an instantaneous movement of an object, a disturbance or the like is not determined to be a manual operation. For example, as illustrated in FIG. 11, whether manual operation is performed is determined at time intervals of Δt, and the presence or absence of the manual operation is determined based on whether the evaluation value (herein, contrast value and brightness value) has changed by more than predetermined value p at each timing. In the example of FIG. 11, a change in the evaluation value exceeds predetermined value p at determination timing T7 so that it is determined that the manual operation has been performed. On the other hand, as illustrated in FIG. 12, a change in the evaluation value does not exceed predetermined value p at determination timing T4 even if there is a change in the evaluation value within time Δt between determination timings T3 and T4. This case is not determined to be a manual operation accordingly.

Time Δt for the determination timing set as above is measured by timer 101. When time Δt has elapsed, the process proceeds to step S1032 by determining to be a determination timing, and otherwise the process proceeds to step S104.

S1032: System controller 10 determines current contrast values of evaluation areas A1-A9 based on the image signal obtained from image sensor 11 through video signal processor 14 in response to the determination of manual operation determiner 15, obtains second contrast value a1 that is a maximum value of the current contrast values, and stores second contrast value a1 in the memory.

S1033: System controller 10 obtains second brightness value b1, which is a brightness value of the image signal obtained from image sensor 11 through video signal processor 14 in response to the determination of manual operation determiner 15, and stores second brightness value b1 in the memory. Second brightness value b1 is a brightness value of the image signal corresponding to a frame or a screen.

S1034: Manual operation determiner 15 determines a difference between first contrast value a0 obtained at time Δt earlier and second contrast value a1 at the determination timing, i.e., a change in the contrast, and determines whether the difference is greater than predetermined value p (FIG. 11). When the change in the contrast exceeds predetermined value p, the process proceeds to step S1036.

S1035: Manual operation determiner 15 determines a difference between first brightness value b0 obtained at time Δt earlier and second brightness value b1 at the determination timing, i.e., a change in the brightness, and determines whether the difference is greater than predetermined value q.

When the change in the brightness exceeds predetermined value q, the process proceeds to step S1036.

S1036: When at least one of the changes in the contrast and in the brightness exceeds the predetermined value, manual operation determiner 15 causes image sensor controller 13 and image sensor actuator 12 to move image sensor 11 to the reference position. When at least one of the changes in the contrast and in the brightness exceeds the predetermined value, it is determined that the manual operation has been performed on the part of the lens barrel, and image sensor 11 is moved to the reference position at which AF control can be properly performed.

S1037: System controller 10 determines current contrast values of image signals in evaluation areas A1-A9 (FIG. 10), obtains a contrast value that is a maximum value of the current contrast values as first contrast value a0, and updates first contrast value a0 in the memory.

S1038: System controller 10 obtains a current brightness value of an image signal as first brightness value b0 and updates first brightness value b0 in the memory.

S1039: System controller 10 resets timer variable t of timer 101 to zero.

Note that determining the manual operation at time intervals of Δt may make a comparison of the evaluation values substantially in less than time Δt if, for example, AF operation is performed in the middle of time Δt. In this case, it is determined to be a manual operation even if there occurs an instantaneous change, such as a disturbance illustrated in FIG. 12, and image sensor 11 may be returned to the reference position. As such, each time the evaluation value is updated, timer 101 is reset as shown in steps S1037 to S1039. Thus, the determination timing is adjusted to create a time difference of Δt between when the evaluation value (a0, b0) and the evaluation value (a1, b1) are obtained.

System controller 10 proceeds to step S104 after determining the manual operation.

1-2-4. Determination of AF Operation

Figure 6:
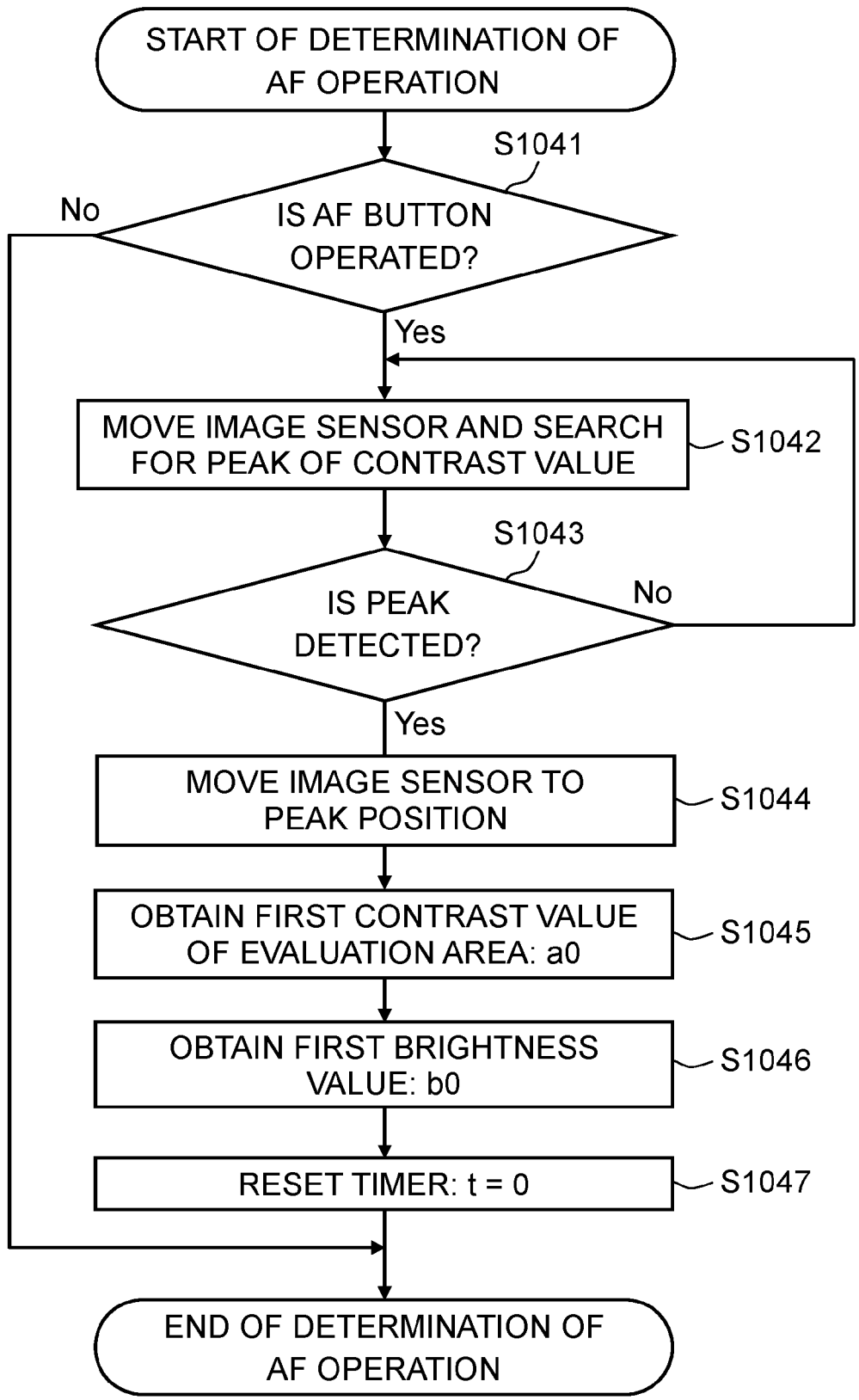
FIG. 6 is a flowchart that includes determination of AF (auto-focus) operation by the camera body.

FIG. 6 is a flowchart showing a detailed process of the determination of AF operation performed in step S104 of FIG. 3.

S1041: System controller 10 detects operation of AF button 51. Specifically, system controller 10 receives a signal from AF button 51 when AF button 51 is pressed by the user.

S1042: Depending upon a command from system controller 10, image sensor controller 13 transmits a command signal to image sensor actuator 12, which causes image sensor 11 to move along optical axis AX. System controller 10 repeats this operation until a peak of the contrast value of the image signal from video signal processor 14, i.e., a focus position, is detected.

Figure 13:
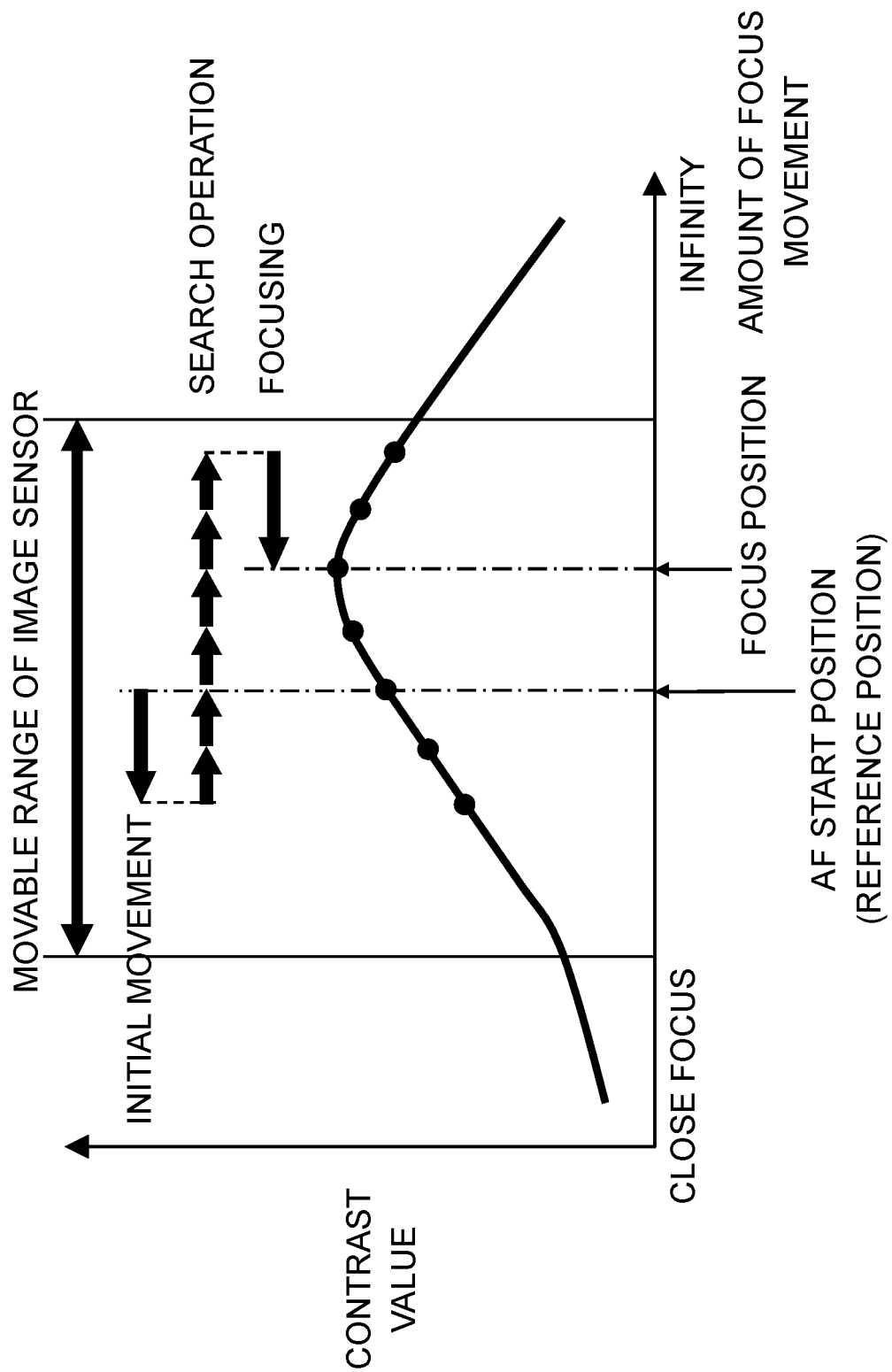
FIG. 13 is a diagram illustrating AF (auto-focus) control by the camera body.

FIG. 13 illustrates the operation of image sensor 11 when AF control is performed. Image sensor 11 is at the reference position when AF control is started, at which time system controller 10 cannot determine whether the focus position is on a close focus side (the left-hand side of FIG. 13) or on the infinity side (the right-hand side of FIG. 13) relative to image sensor 11 so that an initial movement is performed as illustrated in FIG. 13. If the initial movement to the close focus side reduces the contrast value, system controller 10 determines that the focus position is on the infinity side relative to the reference position. On the other hand, if the initial movement to the close focus side increases the contrast value, system controller 10 determines that the focus position is on the close focus side relative to the reference position. Since the focus position is located on the infinity side relative to the reference position in FIG. 13, system controller 10 can search for the focus position by moving image sensor 11 to the infinity side.

S1043: System controller 10 detects whether a peak has been passed.

S1044: System controller 10 calculates the focus position from contrast values neighboring the peak obtained by the search and moves image sensor 11 to the resultant position.

S1045: System controller 10 determines current contrast values of image signals in evaluation areas A1-A9 (FIG. 10), obtains a contrast value that is a maximum value of the current contrast values as first contrast value a0, and updates first contrast value a0 in the memory.

S1046: System controller 10 obtains a current brightness value of an image signal as first brightness value b0 and updates first brightness value b0 in the memory.

S1047: System controller 10 resets timer variable t of timer 101 to zero since the evaluation value is reacquired.

System controller 10 proceeds to step S105 after determining the AF operation.

1-2-5. Determination of Shooting Operation

Figure 7:
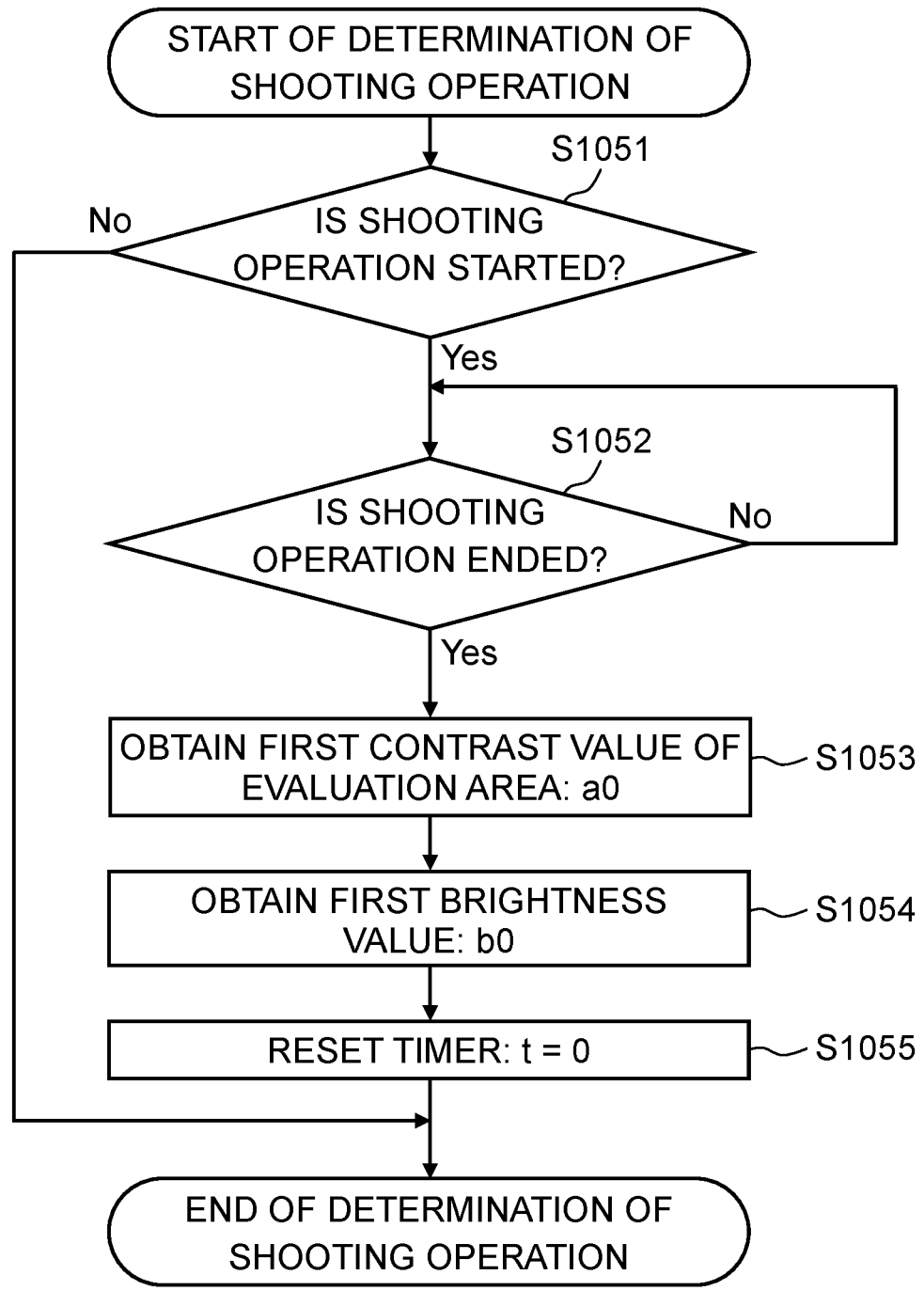
FIG. 7 is a flowchart that includes determination of shooting operation by the camera body.

FIG. 7 is a flowchart showing a detailed process of the determination of shooting operation performed in step S105 of FIG. 3.

S1051: System controller 10 detects operation of shutter-release button 52. Specifically, system controller 10 receives a signal from shutter-release button 52 when shutter-release button 52 is pressed by the user.

S1052: System controller 10 proceeds to step S1053 when the end of the shooting operation is detected.

S1053: System controller 10 determines current contrast values of image signals in evaluation areas A1-A9 (FIG. 10), obtains a contrast value that is a maximum value of the current contrast values as first contrast value a0, and updates first contrast value a0 in the memory.

S1054: System controller 10 obtains a current brightness value of an image signal as first brightness value b0 and updates first brightness value b0 in the memory.

S1055: System controller 10 resets timer variable t of timer 101 to zero since the evaluation value is reacquired.

If the user performs a manual operation on the part of lens barrel 2 during shooting, for example, if the user performs a zoom operation for video production during shooting by using zoom input device 23, the evaluation value is reacquired and the timer is reset in steps S1045 to S1047, thereby preventing the determination of the manual operation during shooting.

1-3. Advantageous Effects

In the present exemplary embodiment, camera body 1 (an example of a camera body) is provided with lens barrel 2 (an example of a lens barrel) having lenses L1, L2 that can be attached to camera body 1, as described above. Camera body 1 includes system controller 10, image sensor controller 13 and manual operation determiner 15, which are examples of controllers for controlling camera body 1, image sensor 11 (an example of an image sensor) for capturing an object image, and image sensor actuator 12 (an example of an image sensor actuator) for driving image sensor 11 along optical axis AX. Controllers 10, 13, 15 determine a change in an optical state of the object image captured by image sensor 11 and, in response to the determination, drives image sensor actuator 12 to move image sensor 11 to a predetermined reference position located within a movable range of image sensor 11.

Thus, camera body 1 determines whether manual operation is performed on the part of lens barrel 2, and an optical adjustment can be performed on the part of camera body 1 based on the determination. Accordingly, camera body 1 can perform the optical adjustment in response to the manual operation on the part of the lens barrel 2 even if information is not obtained from the lens barrel. Consequently, for example, even if camera body 1 cannot communicate electrically with lens barrel 2, manual focus operation on the part of lens barrel 2 allows AF control responsive to the manual focus operation to be performed on the part of camera body 1.

Also, since the optical adjustment is made on the part of camera body 1 by using the manual operation performed on the part of lens barrel 2 in the exemplary embodiment, even a camera where there is a great need for manual operation, such as a professional-use camera, can be provided, which is easy to use for any user.

Digital camera 100 (an example of an imaging device) according to the present exemplary embodiment includes lens barrel 2 (an example of a lens barrel) including focus input device 21, zoom input device 23 and aperture input device 25, each being an example of a manual input device, and the camera body 1 having mount 31 (an example of a mount) for attaching lens barrel 2. Accordingly, the optical adjustment responsive to the manual operation on the part of the lens barrel could be performed on the part of camera body 1 if information is not obtained from the lens barrel.

1-4. Modification

The reference position of image sensor 11 is not limited to the center of the movable range. The reference position may be set, for example, at one end of the movable range.

Figure 14:
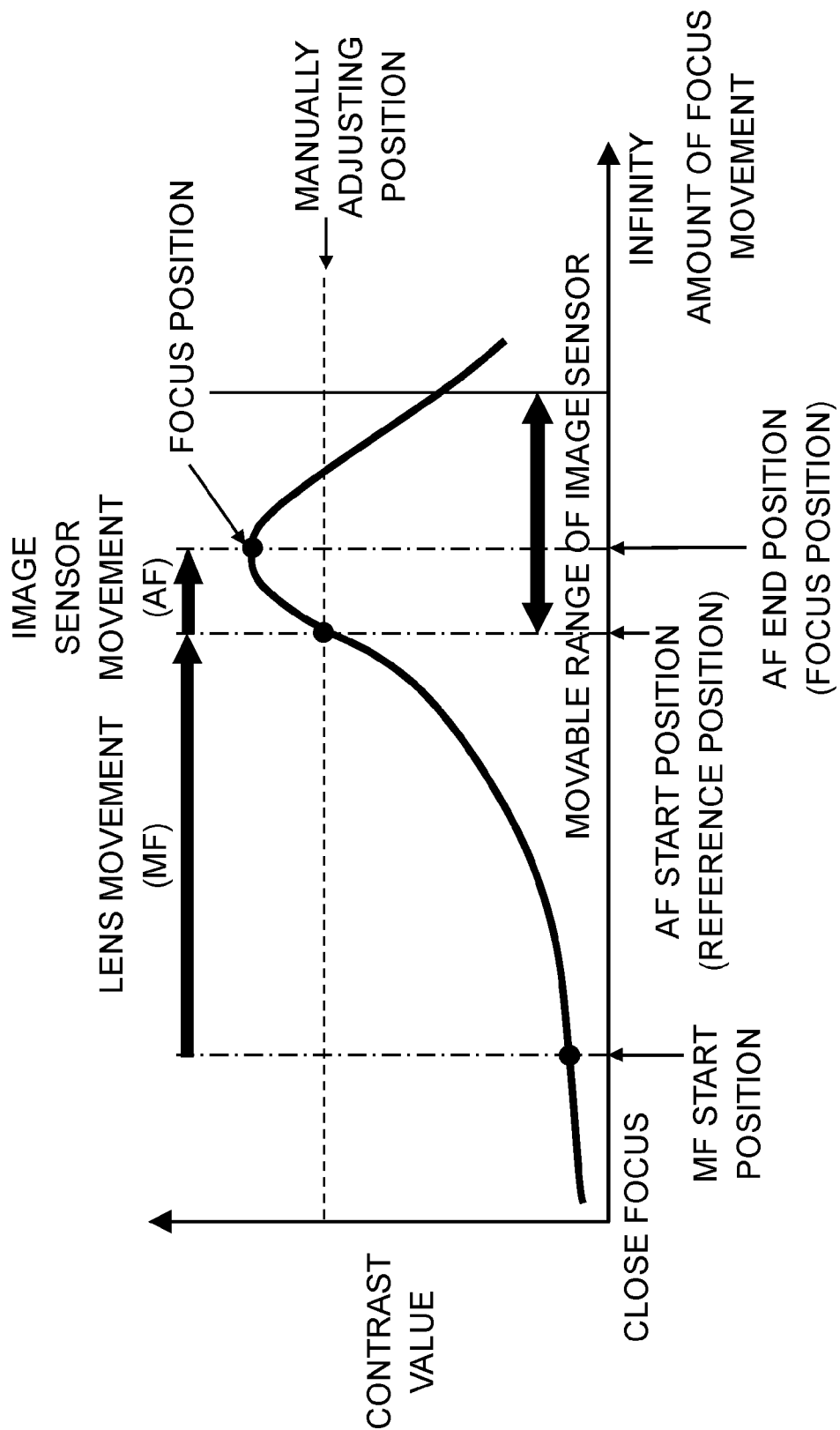
FIG. 14 is a diagram illustrating operation of an image sensor according to a modification.
Figure 15:
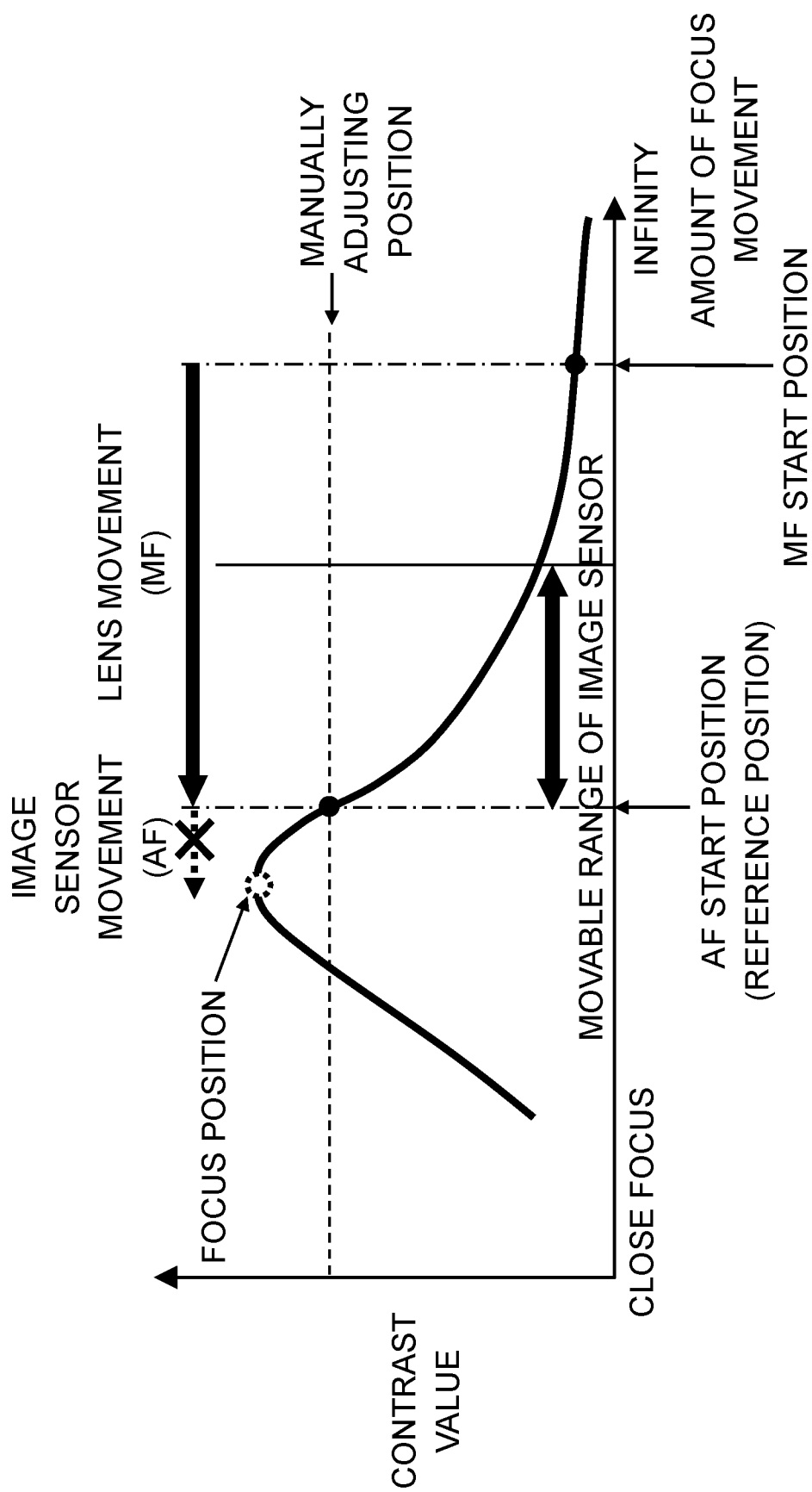
FIG. 15 is a diagram illustrating operation of an image sensor according to a modification.

FIGS. 14 and 15 illustrate examples in which the reference position of image sensor 11 is set at the end on the close focus side of the movable range. In the example of FIG. 14, the focus position is adjusted to be located on the infinity side relative to the reference position by user's manual operation (MF) of lens barrel 2. This is because if the focus position is adjusted to be on the close focus side relative to the reference position by manual operation, image sensor 11 cannot move to the close focus side relative to the reference position so that the focus position cannot be detected as illustrated in FIG. 15.

If image sensor 11 is set at the end on the close focus side of the movable range as illustrated in FIG. 14, image sensor controller 13 controls image sensor actuator 12 to cause image sensor 11 to move to the infinity side for searching after AF control begins. Since the focus position is located on the infinity side by the manually-operated adjustment, a peak can be detected.

Other processes are similar to those in steps S1041 to S1047.

According to the structure described above, image sensor 11 needs no initial operation for detecting a direction of the peak and extends the range of AF control, which can ease requirements for focusing accuracy of manual operations and facilitate signal processing as well.

Note that similar effects could be achieved if the reference position of image sensor 11 is set at the end on the infinity side of the movable range. In this case, the focus position is adjusted to be located on the close focus side relative to the reference position by user's manual operation of lens barrel 2, and image sensor 11 is moved to the close focus side for searching.

Other Exemplary Embodiments

As mentioned above, the exemplary embodiments have been described as examples of the technique disclosed herein. However, the technique according to the present disclosure is not limited thereto and is applicable to exemplary embodiments in which modifications, substitutions, additions, and omissions are made if needed.

Accordingly, other exemplary embodiments are illustrated below.

While both the contrast value and brightness value of the image signal are used as the evaluation value to determine manual operation in camera body 1, either one of the contrast value and brightness value can be used. The contrast value is not necessarily limited to that of the evaluation area, and the contrast value of the entire image signal corresponding to a screen may be used as a representative value. On the other hand, for the brightness value, a representative value of brightness values of a plurality of evaluation areas in an image signal corresponding to a screen may be used.

In camera body 1 described in the exemplary embodiments, a maximum value as the representative value of the contrast value and the brightness value is used for the evaluation value to determine manual operation. Alternatively, a mean value and a median can be used. Furthermore, the manual operation may be determined based on a change in the evaluation values of one or more evaluation areas by comparing evaluation values of each evaluation area.

In camera body 1 described in the exemplary embodiments, functional blocks such as system controller 10, image sensor controller 13, video signal processor 14, manual operation determiner 15, etc. can be implemented as discrete chips or as a single chip including some or all of them, using semiconductor devices such as an LSI or the like.

Some or all of the processes using the functional blocks of the exemplary embodiments may be implemented as computer programs. The processes in the exemplary embodiments may be implemented as hardware. Alternately, the processes may be implemented as software (including OS (operating system), middle ware, or implementation with given libraries) and may be implemented as software and hardware.

Moreover, the sequence of the processing method described in the exemplary embodiment is not necessarily limited to a sequence described in the exemplary embodiment, and the processing sequence can be changed without departing from the spirit and scope of the present disclosure.

The processing method performed by camera body 1, a computer program that causes a computer to perform the processing method, and a computer-readable recording medium on which the program is recorded should be included within the scope of the present disclosure. Here, the computer-readable recording medium includes, for example, flexible disk, hard disk, CD-ROM, MO, DVD, DVD-ROM, DVD-RAM, BD (Blu-ray® Disc) and semiconductor memory. The computer program is not limited to a program recorded on the above recording medium. Alternatively, the computer program can be transmitted over a telecommunication line, wireless or wired communication line, network typified by the Internet, etc.

As mentioned above, the exemplary embodiments have been described as examples of the technique disclosed herein. To this end, the accompanying drawings and detailed description are provided.

Accordingly, the components described in the accompanying drawings and detailed description may include not only those essential for problem solving but also those not essential for problem solving in order to illustrate the above technique. Therefore it should be understood that the accompanying drawings and detailed description of non-essential components does not simply mean that those non-essential components are essential.

The exemplary embodiments described above are to illustrate the technique of the present disclosure, and various modifications, substitutions, additions, and omissions can be made within the scope of the appended claims or the equivalents thereof.

The present disclosure may be applicable to any imaging device, for example, such as a digital camera with an interchangeable lens barrel.

What is claimed is:

1. A camera body to which a lens barrel having an optical system can be attached, the camera body comprising:
    a controller that controls the camera body;
    an image sensor that captures an object image;
    an image sensor actuator that drives the image sensor along an optical axis; and
    a mount to which the lens barrel is detachably mounted, the lens barrel including a plurality of lenses and a manual input device for performing focus adjustment by moving the plurality of lenses,
    wherein when the camera body is not capable of communicating electrically with the lens barrel, the controller, after performing a first focus adjustment by moving the image sensor along the optical axis, (i) determines manual operation of the manual input device of the lens barrel by determining a change in an optical state of the object image captured by the image sensor, (ii) in response to the determination, drives the image sensor actuator to move the image sensor to a reference position located within a movable range of the image sensor, and (iii) performs a second focus adjustment by moving the image sensor along the optical axis, and
    wherein the reference position is a predetermined position.

2. The camera body according to claim 1,
    wherein the movable range of the image sensor has an end on a close focus side and an end on an infinity side, and
    the reference position is at either the end on the close focus side or the end on the infinity side of the movable range.

3. The camera body according to claim 1, wherein
    the controller determines the change in the optical state of the object image based on a contrast value obtained from the image sensor.

4. The camera body according to claim 3, wherein
    the controller obtains contrast values of a plurality of areas in an image signal corresponding to one screen, out of image signals obtained from the image sensor, and
    determines the change in the optical state of the object image based on a representative value of the obtained contrast values.

5. The camera body according to claim 4, wherein
    the representative value is a maximum value of the contrast values.

6. The camera body according to claim 1, wherein
    the controller determines the change in the optical state of the object image based on brightness information obtained from the image sensor.

7. The camera body according to claim 6, wherein
    the controller obtains pieces of brightness information of a plurality of areas in an image signal corresponding to one screen, out of image signals obtained from the image sensor, and
    the controller determines the change in the optical state of the object image based on a representative value of the obtained pieces of brightness information.

8. The camera body according to claim 7, wherein the representative value is a maximum value of the pieces of brightness information.

9. The camera body according to claim 1, further comprising an input device connected to the controller and configured to be operated by a user,
wherein the controller performs the first focus adjustment by driving the image sensor actuator to move the image sensor along the optical axis when the input device is operated.

10. The camera body according to claim 1, wherein the controller adjusts determination timing to determine a change in the optical state of the object image at a predetermined time.

11. The camera body according to claim 1,
wherein the controller drives the imager sensor actuator to move the image sensor in a direction opposite to the reference position towards a position which has been changed by a last-performed focus adjustment.

12. An imaging device comprising:
a lens barrel including a plurality of lenses and a manual input device for performing a first focus adjustment by moving the plurality of lenses; and
a camera body according to claim 1.

13. The camera body according to claim 1, wherein the controller determines the change in the optical state of the object image by comparing (i) a first optical state of the object image obtained after the controller performs the first focus adjustment and (ii) a second optical state of the object image obtained after a predetermined time has elapsed since the first optical state of the object image is obtained.

* * * * *